S. CARLSON.
RACK.
APPLICATION FILED MAR. 8, 1913.

1,088,535.

Patented Feb. 24, 1914.
2 SHEETS—SHEET 2.

Witnesses
Louis R. Heinrichs
C. C. Hines

Inventor
Samuel Carlson
By Victor J. Evans
Attorney

UNITED STATES PATENT OFFICE.

SAMUEL CARLSON, OF ELK POINT, SOUTH DAKOTA.

RACK.

1,088,535.　　　　Specification of Letters Patent.　　Patented Feb. 24, 1914.

Application filed March 8, 1913. Serial No. 753,123.

*To all whom it may concern:*

Be it known that I, SAMUEL CARLSON, a citizen of the United States, residing at Elk Point, in the county of Union and State of South Dakota, have invented new and useful Improvements in Racks, of which the following is a specification.

This invention relates to seed corn racks, for holding ears of corn from which a number of seeds have been removed in order that their germinative power may be tested, the object of the invention being to provide a rack of simple construction and provided with means for supporting the ears of corn in properly designated spaces or compartments, which may be numbered to correspond to the compartments of a testing apparatus, thus enabling the ears of corn to be held in selected relation while the grains are being tested out without liability of confusion or mistake in determining the germinative power of the kernels of each ear.

A further object of the invention is to provide a rack which, while primarily designed for the purpose above stated, may also be used as a rack for drying seed corn, and for other similar purposes.

The invention consists of the features of construction, combination and arrangement of parts hereinafter fully described and claimed, reference being had to the accompanying drawings, in which:—

Figure 1:
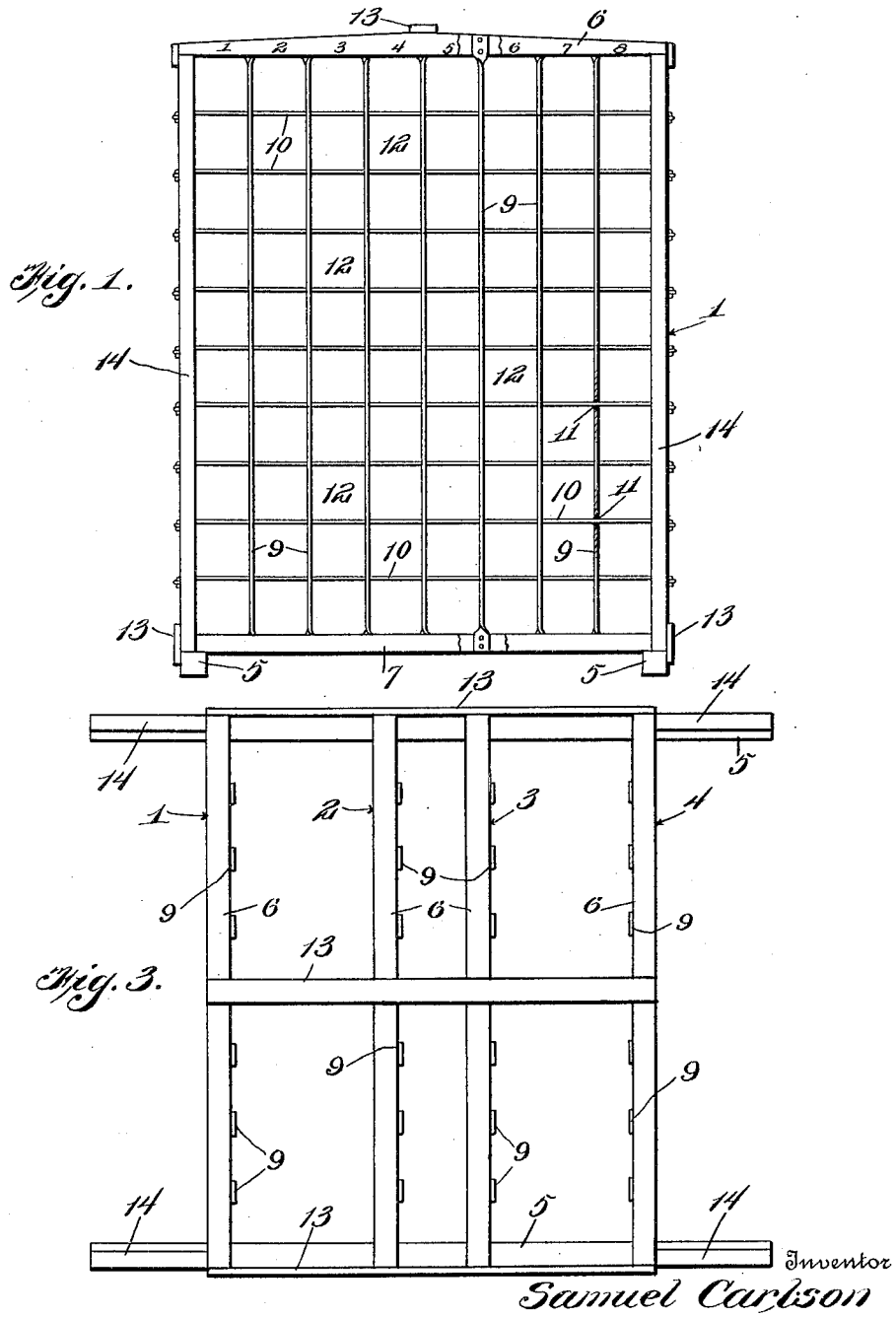
Figure 2:
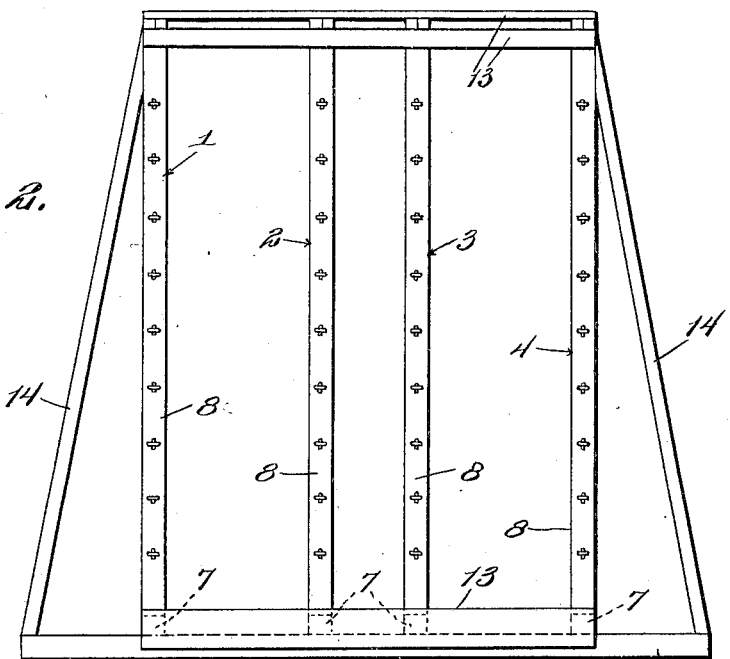
Figure 4:
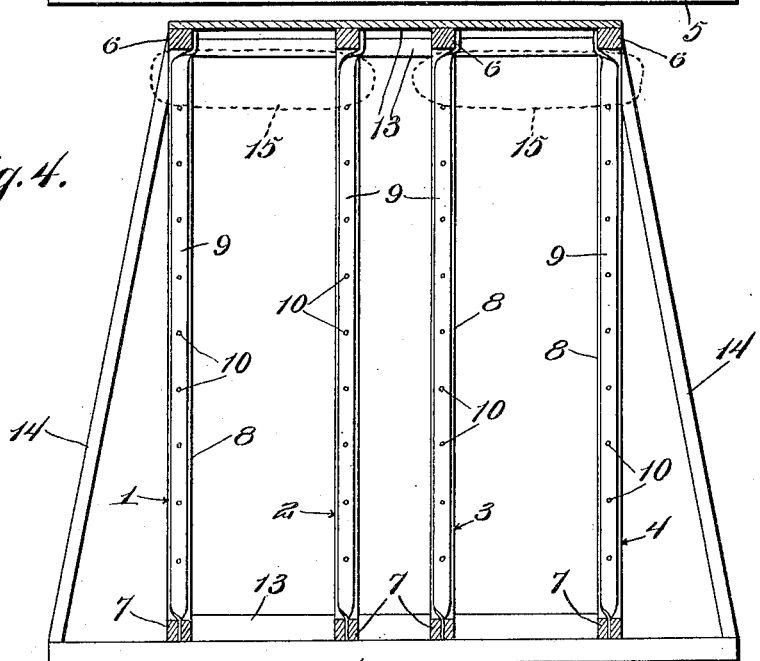

Figure 1 is a front elevation of a seed corn rack embodying my invention. Fig. 2 is a side elevation of the same. Fig. 3 is a top plan view of the rack. Fig. 4 is a vertical front to rear section thereof.

In carrying my invention into practice I provide a rack consisting of a series of parallel rack sections 1, 2, 3 and 4, of which four are shown in the present instance, which rack sections rest upon suitable supporting sills 5 and are secured thereto in any preferred manner. Each rack section consists of a rectangular frame made up of top and bottom bars 6 and 7 and side bars 8 suitably fastened together. Between the top and bottom bars are stretched spaced parallel strands 9 consisting of strips of galvanized sheet metal and between the side bars 8 are stretched strands 10 of galvanized wire, which pass through openings 11 in the strands 9 at their crossing point, forming a meshwork having vertical and horizontal series of spaces or compartments 12. The racks are connected and held in spaced relation by connecting strips 13 and are reinforced from the sills 5 by suitable braces 14. The first two racks 1 and 2 are adapted to support ears of seed corn 15 corresponding in number to the alined pairs of spaces or compartments 12 therein, which respectively receive the ends of the ears, while the rack sections 3 and 4 are adapted to coöperate to simultaneously receive and support another series of ears in like manner. As shown in the present instance, each rack section is provided with eight rows of vertical compartments 12, with ten compartments to each row, the coacting rows of compartments of the rack sections 1 and 2 being designated by the numerals 1 to 8 inclusive, arranged upon the top bar of the rack section 1, while the coöperating compartments of the rack sections 3 and 4 are designated in practice by the numerals 9 to 16 inclusive, which are placed upon the top bar of the outer rack section 4, thus enabling a total of one hundred sixty ears of corn to be supported in a rack of the structure and dimensions illustrated.

While the device is especially designed for use as a holder for ears of seed corn from which seeds have been removed for germinative tests, it will, of course be understood that it may be employed as a seed corn drying rack and for other similar purposes.

I claim:—

1. A seed corn rack comprising a plurality of spaced, vertical rectangular frames connected in fixed relationship, each of said frames comprising top, bottom and side bars, vertically disposed flat metallic strips extending between the top and bottom bars, said strips being provided with equidistantly spaced rows of perforations being arranged edgewise in the same plane and quarter twisted at their ends in planes parallel to each other, and at right angles to the body portions of the strips, the ends of said strips being secured to the said top and bottom bars, and horizontal transverse wires extending through the perforations in the alined strips and secured to the side bars of the rectangular frames, said frames, strips and wires being arranged to provide spaced alined vertical and horizontal rows of corn receiving spaces.

2. A seed corn rack comprising longitudinal and transverse top and bottom bars, vertical bars uniting the same, said bars forming a pair of spaced rectangular frames, and the longitudinal bars extending outwardly at the front and rear of said frames, vertical strips secured to the upper and lower transverse bars and having perforations therein, wires extending through the perforations in said strips and united to the vertical bars, said wires forming horizontal and vertical rows of ear receiving spaces, and inclined braces connecting the extended ends of the lower longitudinal bars with the upper portions of the rectangular frames.

3. A seed corn rack comprising a base, a plurality of pairs of spaced parallel rack sections rising from the base, each of said rack sections comprising a frame and vertical and transverse strands stretched across the frame and forming rows of ear receiving spaces, said frame being provided with designations distinguishing said rows of ear receiving spaces, the corresponding ear receiving spaces of each pair of rack frame sections being arranged in alinement with each other.

In testimony whereof I affix my signature in presence of two witnesses.

SAMUEL CARLSON.

Witnesses:
 FRANK ANDERSON,
 R. M. CROWDER.

Copies of this patent may be obtained for five cents each, by addressing the "Commissioner of Patents, Washington, D. C."